(12) United States Patent
Liu et al.

(10) Patent No.: US 8,069,027 B2
(45) Date of Patent: Nov. 29, 2011

(54) WORD ALIGNMENT APPARATUS, METHOD, AND PROGRAM PRODUCT, AND EXAMPLE SENTENCE BILINGUAL DICTIONARY

(75) Inventors: Shaoming Liu, Kanagawa (JP); Honglin Wu, Shenyang (CN)

(73) Assignee: Fuji Xerox Co., Ltd., Tokyo (JP)

( * ) Notice: Subject to any disclaimer, the term of this patent is extended or adjusted under 35 U.S.C. 154(b) by 1064 days.

(21) Appl. No.: 11/492,951

(22) Filed: Jul. 26, 2006

(65) Prior Publication Data
US 2007/0174040 A1  Jul. 26, 2007

(30) Foreign Application Priority Data
Jan. 23, 2006 (JP) ................. 2006-014468

(51) Int. Cl.
G06F 17/27 (2006.01)
G06F 17/28 (2006.01)
(52) U.S. Cl. ............... 704/2; 704/4; 704/9; 704/10
(58) Field of Classification Search ........... 704/2, 4
See application file for complete search history.

(56) References Cited

U.S. PATENT DOCUMENTS
2006/0095248 A1* 5/2006 Menezes et al. .................. 704/3

FOREIGN PATENT DOCUMENTS
EP 1308851 A2 * 5/2003
JP 10-143514 5/1998
JP A 2005-258637 9/2005

OTHER PUBLICATIONS

Matusov et al.; "Symmetric Word Alignments for Statistical Machine Translation;" *Proceedings of the 20th international conference on Computational Linguistics*; 2004; No. 219.
Huang, et al; (2000); "Using Bilingual Semantic Information in Chinese-Korean Word Alignment"; Pacific Asia Conference on Language, Information and Computation; PACLIC14; pp. 121-130.
Melamed, I.D.; (1997); "A Word-to-Word Model of Translation Equivalence"; in Procs. Of the ACL97, Madrid Spain; pp. 490-497.
Levenshtein, V.I.; (1971); "One Method of Constructing Quasilinear Codes Providing Synchronization in the Presence of Errors"; Problems of Information Transmission; vol. 7, No. 3; pp. 215-222.
Aizawa, et al.; (2000); "Calculating Associations between Technical Terms Based on Co-occurrences in Keyword Lists of Academic Papers"; IEICI, D-I; vol. J83-D-I, No. 11; pp. 1154-1162.

(Continued)

*Primary Examiner* — Justin Rider
(74) *Attorney, Agent, or Firm* — Oliff & Berridge, PLC

(57) ABSTRACT

A word alignment apparatus includes a word extracting portion that extracts each word from an example sentence and from a translation sentence thereof, an alignment calculator that calculates at least one of a similarity degree and an association degree between a word in a first language and that in a second language to perform an alignment between words respectively included in the example sentence in the first language and those included in the translation sentence thereof in the second language on the basis of a calculated value, and an optimization portion that optimizes the alignment by performing a bipartite graph matching.

20 Claims, 14 Drawing Sheets

RESULT OF MORPHOLOGIC ANALYSIS

- 汤姆/n  是/v  一/m  个/q  程序/n  员/n

FIRST WORD IS A NOUN, "汤姆"

SECOND WORD IS A VERB, "是" IN THE ABOVE EXAMPLE SENTENCE

- トムはプログラマーです

トム/UNKNOWN WORD  は/POST-POSITION  プログラマー/NOUN  です/AUXILIARY VERB

OTHER PUBLICATIONS

Schutze, H.; (1995); "Ambiguity Resolution in Language Learning: Computational and Cognitive Models"; CSLI Publications, Center for the Study of Language and Information, Stanford University, California.

Kozima, et al.; (1993); "Semantic Similarity between Words"; IEICE; AI92-100; pp. 81-88.

Kozima, et al.; (1997); "A Context-sensitive Measurement of Semantic Word Distance"; IEICE; vol. 38, No. 3; pp. 482-489.

Gale, et al.; (1991); "Identifying Word Correspondences in Parallel Texts"; In Proceedings of DARPA Workshop on Speech and Natural Language, Pacific Grove, California; pp. 152-157.

Lawler, E.L.; (1976); "Combinatorial Optimization: Networks and Matroids"; Holt, Rinehart and Winston, New York, NY.

Jun. 28, 2011 Office Action issued in corresponding Japanese Patent Application No. 2006-014468 (with translation).

Tetsuyasu Takao et al., "Automatic Extraction of Translation Word Information from Parallel Text Corpus", IPSJ SIG Notes, Japan, Information Processing Society of Japan, Sep. 12, 1996, vol. 96, No. 87, pp. 51-58 (with partial translation).

Mihoko Kitamura et al., "Automatic Extraction of Translation Patterns in Paralled Corpora", Transactions of Information Processing Society of Japan, Japan, Information Processing Society of Japan, Apr. 15, 1997, vol. 38, No. 4, pp. 727-736 (with partial translation).

* cited by examiner

PAIR OF ONE EXAMPLE SENTENCES { 我是富士太郎。
私は富士太郎です。

PAIR OF ONE EXAMPLE SENTENCES { 这条河是黄河。
この川は黄河です。

FIG. 6A  PAIR OF BILINGUAL EXAMPLE SENTENCES

EXAMPLE: INPUTTED PAIR OF EXAMPLE SENTENCE
AND TRANSLATION SENTENCE THEREOF

汤姆是一个程序员

トムはプログラマーです

FIG. 6B  RESULT OF MORPHOLOGIC ANALYSIS

- 汤姆/n  是/v  一/m  个/q  程序/n  员/n

FIRST WORD IS A NOUN, "汤姆"

SECOND WORD IS A VERB, "是" IN THE ABOVE EXAMPLE SENTENCE

- トムはプログラマーです

トム/UNKNOWN WORD  は/POST-POSITION  プログラマー/NOUN  です/AUXILIARY VERB

FIG. 9

|   | j | NOT j |
|---|---|---|
| c | a | b |
| NOT C | c | d |

N: total sentence pairs number of the corpus
a = freq(c, j)
b = freq(c) - freq(c, j)
c = freq(i) - freq(c, j)
d = N - a - b - c

FIG. 10

$X^2$    $X^2(c, j) = \dfrac{(ad - bc)^2}{(a+b)(a+c)(b+d)(c+d)}$

DICE COEFFICIENT    $DICE(c, j) = \dfrac{2a}{(a+b)(a+c)}$

MUTUAL INFORMATION AMOUNT    $MI(c, j) = \log_2 \dfrac{N \times a}{(a+b)(a+c)}$

T-SCORE    $T\text{-score}(c, j) = \dfrac{an - (a+b)(a+c)}{n\sqrt{a}}$

| 汤姆 | 1 | 0 | 0 | 0 | 0 | 0 | 0 | 0 | 0 | 0 |
| 是 | 0 | 0 | 0 | 1 | 0 | 0 | 0 | 0 | 0 | 0 |
| 一 | 0 | 0 | 0 | 0 | 0 | 0 | 0 | 0 | 0 | 0 |
| 个 | 0 | 0 | 0 | 0 | 0 | 0 | 0 | 0 | 0 | 0 |
| 程序 | 0 | 0 | 1 | 0 | 0 | 0 | 0 | 0 | 0 | 0 |
| 员 | 0 | 0 | 1 | 0 | 0 | 0 | 0 | 0 | 0 | 0 |

| トム | 1 | 0 | 0 | 0 | 0 | 0 | 0 | 0 | 0 | 0 |
| は | 0 | 0 | 0 | 0 | 0 | 0 | 0 | 0 | 0 | 0 |
| プログラマ | 0 | 0 | 0 | 0 | 1 | 1 | 0 | 0 | 0 | 0 |
| です | 0 | 1 | 0 | 0 | 0 | 0 | 0 | 0 | 0 | 0 |

FIG. 11C

汤姆 ⇔ トム
是　⇔ です
一　⇔ null
个　⇔ null
程序/员/ ⇔ プログラマ
null ⇔ は

FIG. 13
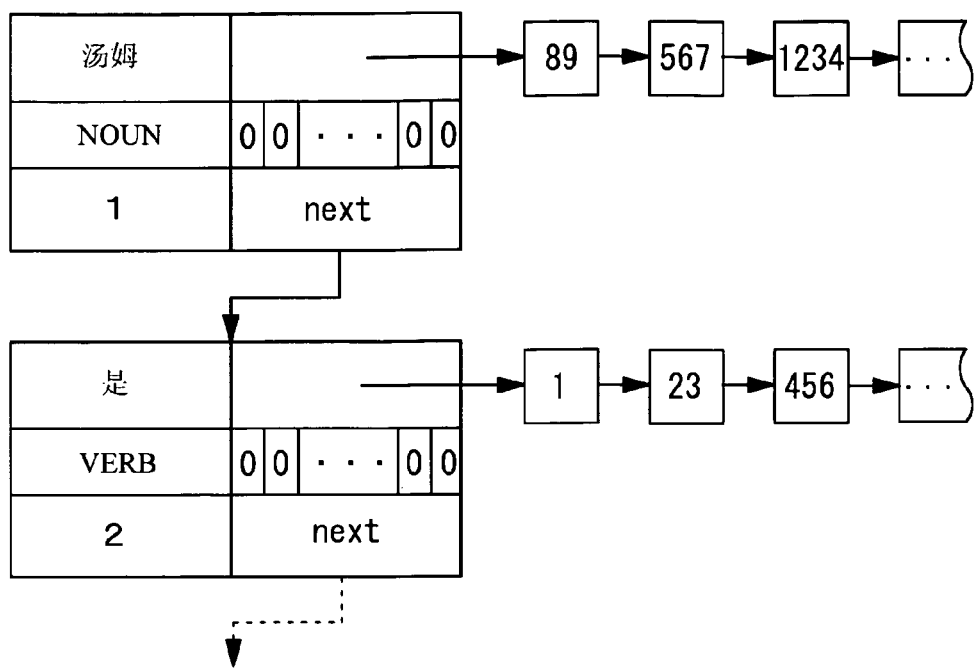
EXAMPLE SENTENCE
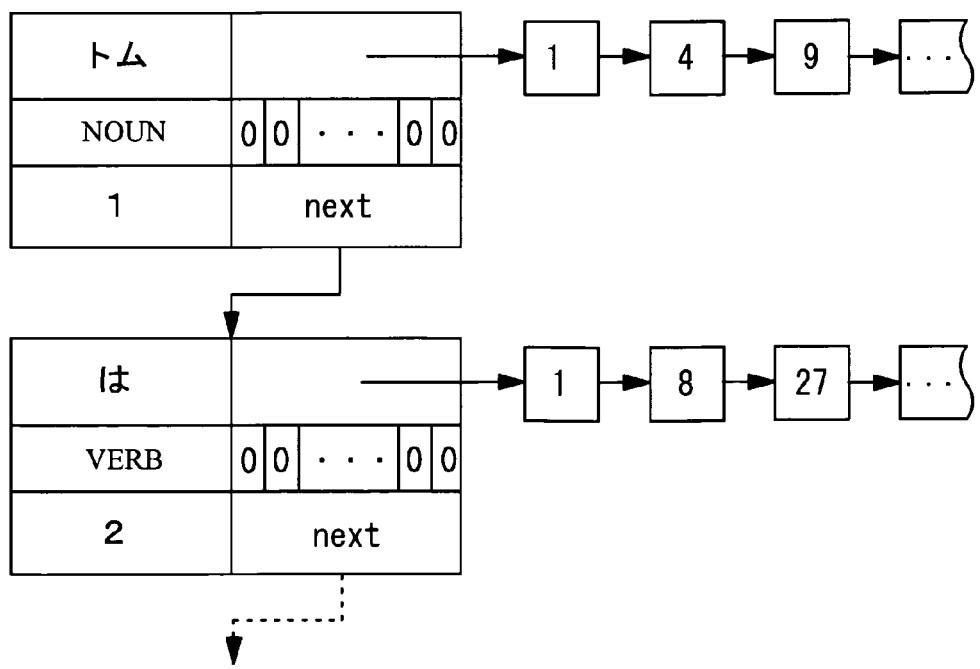
TRANSLATION SENTENCE

TWO-PART GRAPH

TWO-PART GRAPH MAXIMUM AND MINIMUM WEIGHT MATCHING

FIG. 16

EXAMPLE SENTENCE BILINGUAL DICTIONARY INCLUDES 15,405 PAIRS OF EXAMPLE SENTENCES AND AREA BELONGS TO SPORT JOURNAL ARTICLE

TEST ASSEMBLY (OPEN TEST) INCLUDES 98 PAIRS OF EXAMPLE SENTENCES AND AREA BELONGS TO SPORT JOURNAL ARTICLE

| | Recall | Precision | F-Score |
|---|---|---|---|
| Baseline1: (Dict) | 38% | 93% | 54% |
| Baseline2: ($X^2$+Dict) | 67% | 76% | 71% |
| 2BG(SimD+SimS+SimM+SimP+Ass1) | 72% | 76% | 74% |
| 2BG(SimD+SimS+SimM+SimP+$X^2$) | 72% | 90% | 80% |

FIG. 17

$$\text{RECALL RATE} = \frac{\text{NUMBER OF PAIRS OF WORDS THAT HAVE BEEN ACTUALLY EXTRACTED}}{\text{NUMBER OF PAIRS OF WORDS THAT SHOULD BE EXTRACTED}}$$

$$\text{PRECISION} = \frac{\text{NUMBER OF PAIRS THAT ARE CORRECT}}{\text{NUMBER OF PAIRS THAT HAVE BEEN ACTUALLY EXTRACTED}}$$

WORD ALIGNMENT APPARATUS, METHOD, AND PROGRAM PRODUCT, AND EXAMPLE SENTENCE BILINGUAL DICTIONARY

BACKGROUND

1. Technical Field

This invention generally relates to a word alignment apparatus, example sentence bilingual dictionary, word alignment method, and program product for word alignment.

2. Related Art

Machine translation is to convert from one language into another with the use of a computing machine. The research and development of the machine translation has been carried out around the glove over half a century. The machine translation system can be broadly categorized into (1) analysis-based machine translation, (2) example-based machine translation, and (3) statistics-based machine translation.

The analysis-based machine translation is a technique of analyzing a first language (morphologic analysis, syntactic and semantic analysis, and the like), converting an analysis result into a second language, and generating a translation sentence in the second language. Since the performance of analysis technique of a natural language is not good, it has limitations that to develop a good performance analysis-based machine translation system is very difficult. In addition, there are drawbacks in that learning is impossible, and thereby it is difficult to improve a translation engine.

The statistics-based machine translation is a technique of building a translation model with the use of a language model and a statistics model. In this method, realization is limited, because learning data (corpus) necessary for construction of each model is limited.

The example sentence-based machine translation imitates a mechanism how the human leans a foreign language, and translates a new document with reference to a translated example sentence that has been learned. In 1980s, Professor Nagao proposed this translation system for the first time. Since then, the research and development of the example-based machine translation have been increased.

SUMMARY

An aspect of the invention provides a word alignment apparatus including: a word extracting portion that extracts each word from an example sentence and from a translation sentence thereof; an alignment calculator that calculates at least one of a similarity degree and an association degree between a word in a first language and that in a second language to perform an alignment between words respectively included in the example sentence in the first language and those included in the translation sentence thereof in the second language on the basis of a calculated value; and an optimization portion that optimizes the alignment by the maximum weight matching on bipartite graph.

BRIEF DESCRIPTION OF THE DRAWINGS

Embodiments of the present invention will be described in detail based on the following figures, wherein:

FIG. 6A and FIG. 6B illustrate an example of a morphologic analysis on the preprocessor and on the corpus preprocessor;

FIG. 9 illustrates parameters of an association degree;

FIG. 10 shows other calculation examples of the association degree;

FIG. 11A through FIG. 11C illustrate similarity degree/association degree lists;

FIG. 13 is a view illustrating examples of the data structure;

FIG. 16 is a table showing comparison results of recall rates and precision in the word alignment used in the second exemplary embodiment of the present invention and a conventional word alignment; and FIG. 17 illustrates a recall rate and precision in the word alignment.

DETAILED DESCRIPTION

A description will now be given, with reference to the accompanying drawings, of exemplary embodiments of the present invention.

Embodiments

Figure 1:
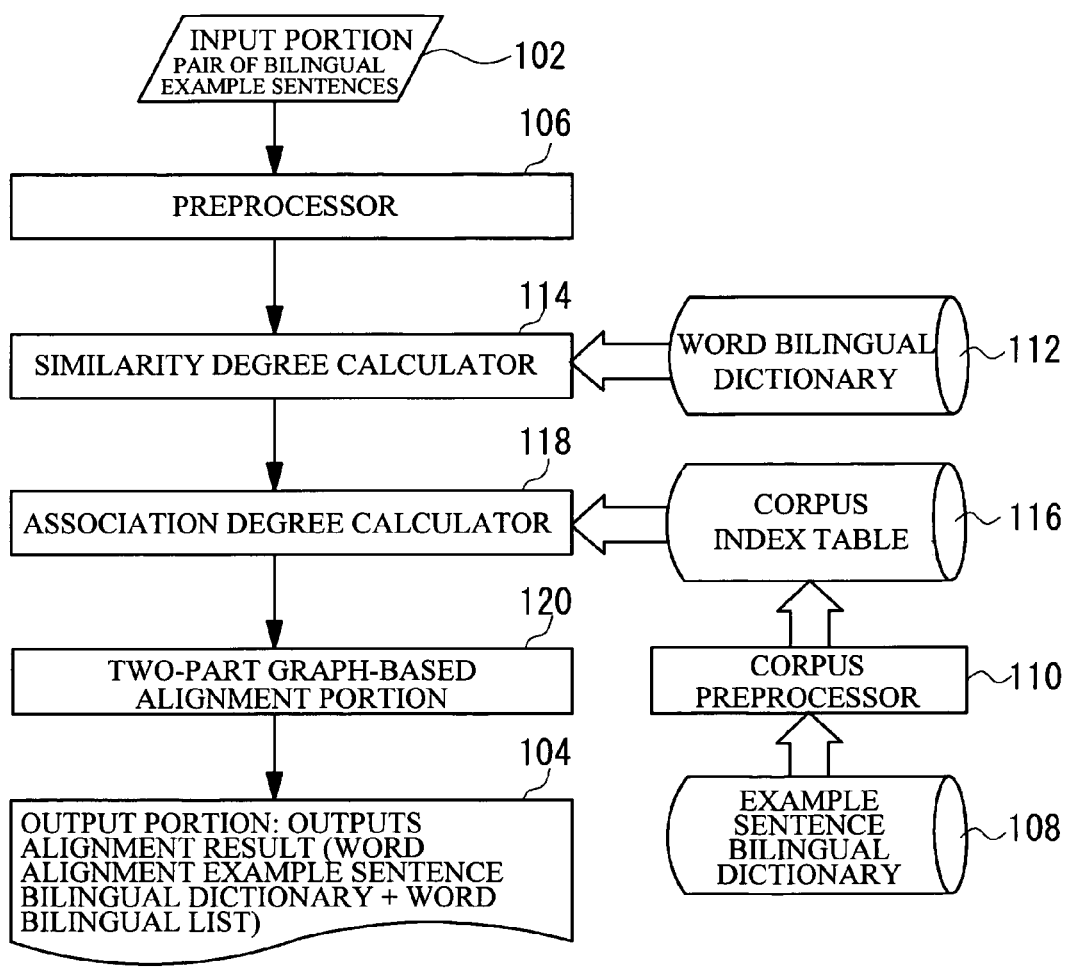
FIG. 1 is a functional block diagram illustrating a whole configuration of a word alignment apparatus according to an exemplary embodiment of the present invention.

FIG. 1 is a functional block diagram illustrating a whole configuration of a word alignment apparatus according to an exemplary embodiment of the present invention. A word alignment apparatus 100 includes an input portion 102, an output portion 104, a preprocessor 106, an example sentence bilingual dictionary 108, a corpus preprocessor 110, a word bilingual dictionary 112, a similarity degree calculator 114, a word index table 116, an association degree calculator 118, and the maximum weight matching on bipartite graph-based alignment portion 120. Specifically, the input portion 102 is provided for inputting a pair of bilingual example sentences, which include an example sentence and a translation sentence thereof. The output portion 104 outputs an alignment result to be stored in an example sentence pattern bilingual dictionary for an example-based machine translation, as a result of a learning apparatus. The preprocessor 106 performs a morphologic analysis on the example sentence and the translation sentence thereof, extracts words and Part of Speech (POS) included therein respectively, and applies numbers thereto. The example sentence bilingual dictionary 108 stores a pair of the example sentence and the translation sentence thereof. The corpus preprocessor 110 extracts the words and POS respectively from the pair of the example sentence and the translation sentence thereof that have been input from the example sentence bilingual dictionary 108, and establishes a corpus index that enables a fast search. The word bilingual dictionary 112 stores the words and the translation words thereof. The similarity degree calculator 114 performs a word alignment with the use of a word bilingual dictionary. The word index table 116 stores an index table of words that have been built on the corpus preprocessor 110. The association degree calculator 118 calculates an association degree between a word and a translation word thereof with the use of corpus statistic information of the word index table. The bipartite graph-based alignment portion 120 optimizes an alignment between words, by addressing an issue of an alignment candidate of low-confirmation degree or an alignment problem of multiple correspondences, with the use of a bipartite graph matching method.

Figures 2, 3A, 3B:
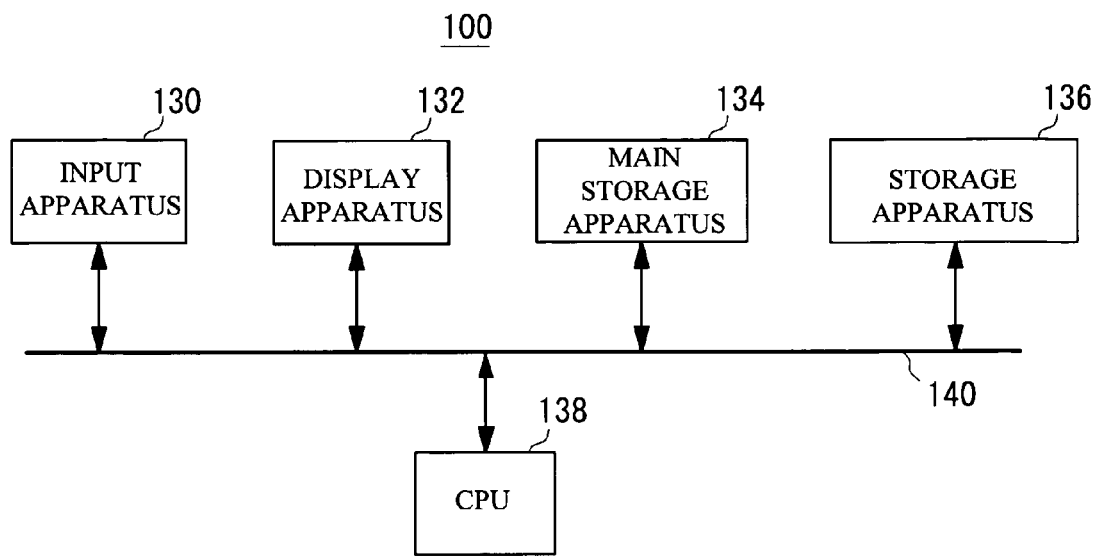
FIG. 2 is a view showing a configuration of the word alignment apparatus.
FIG. 3A and FIG. 3B illustrate contents of a bilingual example sentence dictionary.

FIG. 2 is a view showing a configuration of the word alignment apparatus. The word alignment apparatus 100 is composed of an input apparatus 130, a display apparatus 132, a main storage apparatus 134, an storage apparatus 136, a central processing unit (CPU) 138, and a bus 140 that connects the above components.

The input apparatus 130 includes a keyboard, a scanner, an input interface, or the like. Information is input by a key operation on the keyboard. A document or the like in an original document is optically read by the scanner. Data is input into the input interface from an external apparatus, external memory, or the like. The display apparatus 132 includes a display or the like that displays a word-aligned result or a pair of an example sentence and a translation sentence thereof. The main storage apparatus 134 includes a ROM or RAM to store a program that controls the operation of each component shown in FIG. 1, data that has been processed or computed, and the like. The storage apparatus 136 includes, for example, a large capacity storage apparatus such as a hard disc or the like, so as to store data of a word bilingual dictionary or an example sentence bilingual dictionary, or the like. The CPU 138 controls each component, according to the program stored in the main storage apparatus 134.

The example sentence bilingual dictionary 108 is composed of an assembly of pairs of example sentences. Each pair is composed of a sentence in a first language and a translation sentence thereof in a second language. For instance, if an example sentence bilingual dictionary is provided for Japanese and Chinese, a Japanese sentence of "My name is Taro Fuji." and a Chinese translation sentence thereof are stored as shown in (a) below and in FIG. 3A. A Japanese sentence of "This river is Yellow River." And a Chinese translation sentence thereof are also stored as shown in (b) below and in FIG. 3B.

Figure 4:
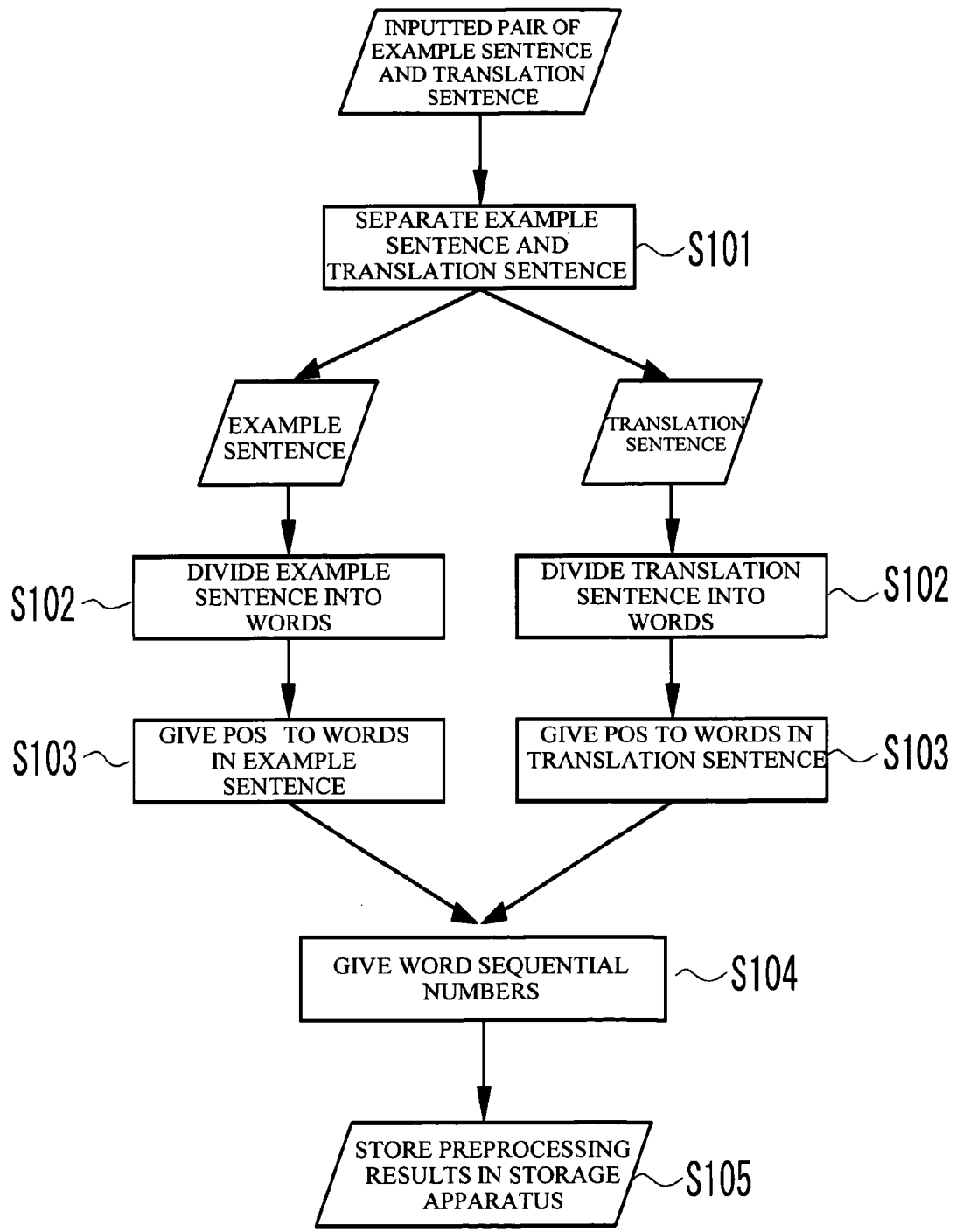
FIG. 4 is a flowchart describing an operation of a preprocessor.

FIG. 4 is a flowchart describing an operation of the preprocessor. The preprocessor 106 separates a pair of an example sentence and a translation sentence thereof that have been input from the input portion, into an example sentence and a translation sentence thereof (step S101). The pair of the example sentence and the translation sentence thereof stored, for example, in the example sentence bilingual dictionary are used. The morphologic analysis is respectively performed on such separated example sentence and the translation sentence thereof, and the example sentence and the translation sentence thereof are respectively separated into words (step S102). POS are respectively given to such separated words (step S103). Then, a word serial number is given (step S104). The word serial number is given from left to right, in the order of appearance, and in ascending order from 1. Lastly, a preprocessing result is stored in the storage apparatus (step S105). The preprocessing result respectively includes word information arrangement of the example sentence and that of the translation sentence thereof.

Figure 5:
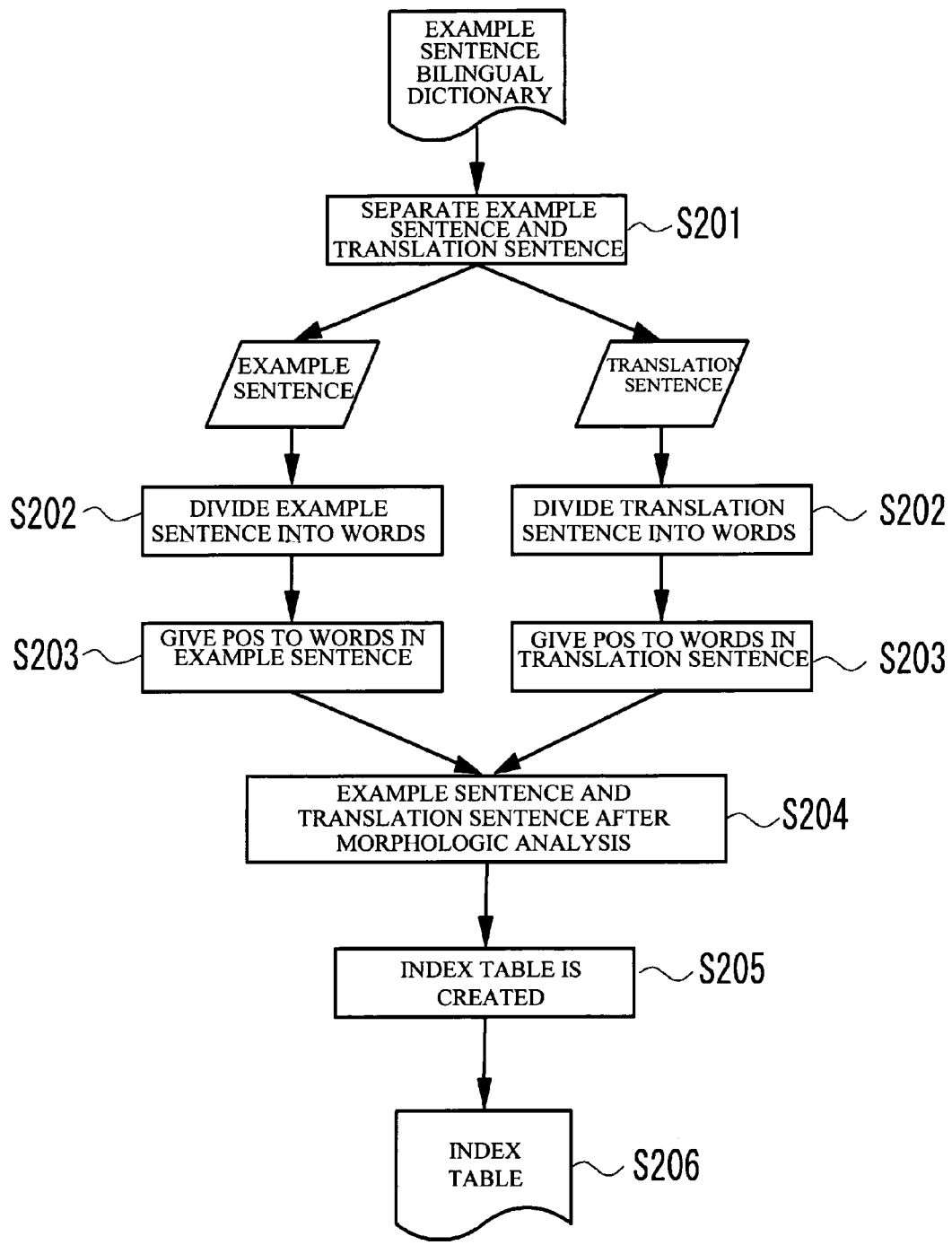
FIG. 5 is a flowchart describing an operation of a corpus preprocessor.

FIG. 5 is a flowchart describing an operation of the corpus preprocessor 110. The corpus preprocessor 110 separates a pair of an example sentence and a translation sentence thereof that have been input from the example sentence bilingual dictionary 108, into an example sentence and a translation sentence thereof (step S201). The morphologic analysis is respectively performed on such separated example sentence and the translation sentence thereof, and the example sentence and the translation sentence thereof are separated into words (step S202). POS are respectively given to such separated words (step S203). Then, the example sentence and the translation sentence thereof on which the morphologic analysis is performed are collected (step S204), and an index table is created (step S205) to store in a memory as an index table (step S206).

The morphologic analysis extracts the words and POS information constituting a natural language sentence. In the morphologic analysis, it is possible to use an arbitrary morphologic analysis tool, which is available to the public. For example, a morphologic analysis tool ChaSen can be used for Japanese, and a Chinese morphologic analysis tool developed by Tsinghua University or Northeastern University for Chinese. For example, when a pair of an example sentence and a translation sentence thereof are input as shown in FIG. 6A, a morphologic analysis result as shown in FIG. 6B is obtained. Here, also on the preprocessor 106, a similar morphologic analysis is performed.

The word index table is composed of words and index information thereof. The word index information includes a number list of an example sentence that includes words or the translation sentence thereof. For example, if a word "China" appears in 1949-th example sentence, in the tenth example sentence, and in the first example sentence, indexes of "China" are respectively 1949, 10, and 1. If a word "card" appears in 1234-th example sentence, in the 567-th example sentence, and in the 89-th example sentence, indexes of "card" are 1234, 567, and 89.

Figure 7:
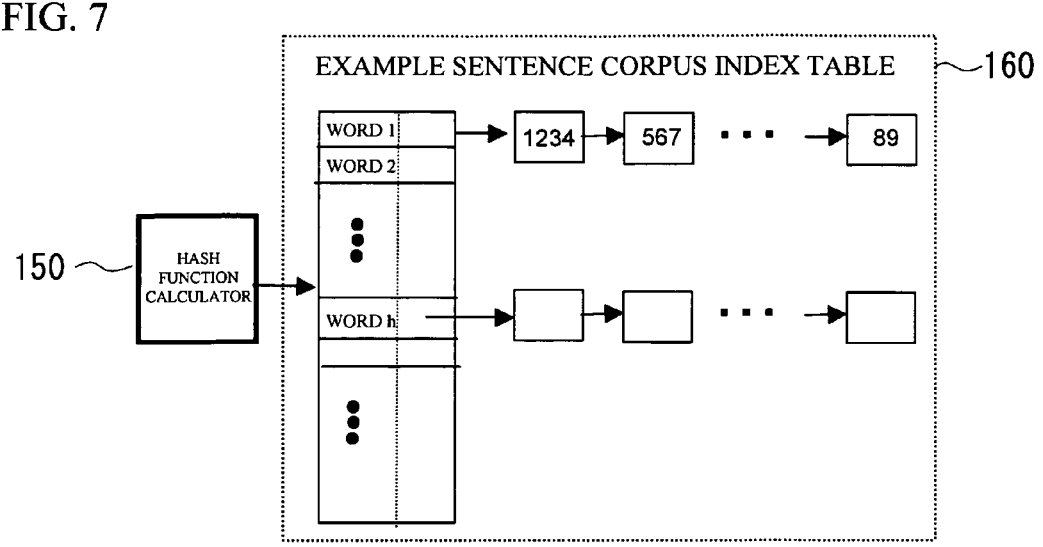
FIG. 7 is a view illustrating an example of a corpus index table.

FIG. 7 shows an example of the index table. The corpus preprocessor 110 includes a hash function calculator 150, an example sentence corpus index table 160, and a translation sentence corpus index table 170. Each of the corpus index tables 160 and 170 is composed of a word list (word 1, 2, . . . ) and a sentence number table (an example sentence number or translation sentence number). The word list table of the example sentence corpus index table includes words appearing in all example sentences in the corpus, and the word list table of the translation sentence corpus index table includes words appearing in all translation sentences in the corpus. The sentence number table of the example sentence corpus index table stores all the example sentence numbers included in the corpus having a corresponding word in a form of list table. For example, with respect to the above-described "card", all the numbers of the example sentences in which the "card" appears. In a similar manner, on the sentence number table of the translation sentence corpus index table, all the translation sentence numbers in the corpus that includes the corresponding word are stored in a form of list table. For example, the number of the translation sentence in which "China" appears is stored. The hash function calculator 150 is provided for calculating where the word appears, and is capable of utilizing a known hash function.

Next, a description is given of a similarity degree calculator 114 in detail. The similarity degree calculator 114 calculates a similarity degree between words included in an example sentence and a translation sentence thereof, which have been extracted by the morphologic analysis performed on such input example sentence and the translation sentence thereof, as stated above, and an alignment (association) between the words in the example sentence and those in the translation sentence is obtained.

Figure 8:
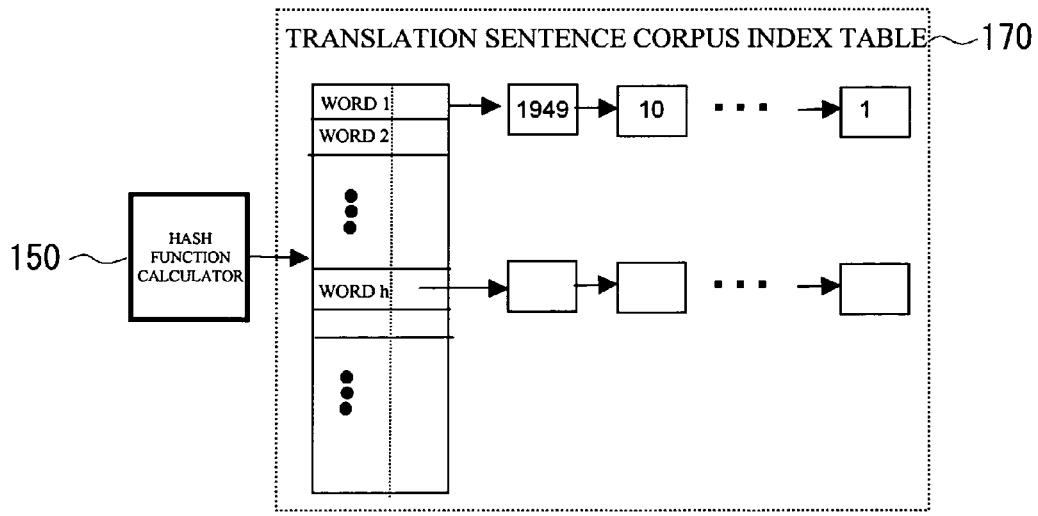
FIG. 8 is shows a dictionary record structure stored in a word bilingual dictionary.

FIG. 8 shows a dictionary record structure stored in the word bilingual dictionary 112. The dictionary record structure includes a word, word information, translation word, and translation word information. The word information is the information showing an attribute of the POS or the like of the word. The translation word information is the information showing the POS or the like of the translation sentence.

The similarity degree calculator 114 calculates to obtain multiple similarity degrees between words in an example sentence and in a translation sentence thereof. That is to say, a dictionary similarity degree, a shape similarity degree, a semantic similarity degree, and a POS similarity degree are calculated.

(a) Dictionary similarity degree SimD: c is set to an arbitrary word in an example sentence CS, and DTc is set to an assembly of translation words of c in the word bilingual dictionary. With respect to an arbitrary word j of a translation sentence JS, if j is included in DTc, SimD (c, j)=1. In other words, if a translation word of the word c in the example sentence is included in the word bilingual dictionary, SimD is set to "1". If not, SimD is set to "0".

(b) Shape similarity degree SimM: with respect to each word c in an example sentence CS where SimD(c, j)≠1, a confidence degree is calculated with a following expression (1) on an arbitrary word in a translation sentence JS where SimD (w, j)≠1. Here, it is assumed that the example sentence is Chinese and the translation sentence thereof is Japanese (alternatively, the example sentence is Japanese and the translation sentence thereof is Chinese). If a Japanese Kanji character is included in the translation sentence JS and if there is a corresponding simplified Chinese character, the Japanese Kanji character is converted into the simplified Chinese character. Then, SimM (c, j) is calculated. As a matter of course, SimM (c, j) may be calculated, after the simplified Chinese character is converted into the Japanese Kanji character. Also, a traditional Chinese character is processed in a similar manner.

[Expression (1)]

$$SimM(c, j) = \frac{2 \times |c \cap j|}{|c| + |j|} \quad (1)$$

(c) Semantic similarity degree SimS: with respect to each word c in the example sentence CS where SimD(c, j)≠1, DTc is set to an assembly of translation words of c in the word bilingual dictionary. A confidence degree is calculated with a following expression (2) on an arbitrary word in a translation sentence JS where SimD(w, j)≠1. In a method of calculating Distance (e, j) or Similarity (e, j), for example, an arbitrary method available to the public of calculating a distance between words or calculating a similarity degree can be used as shown in an expression (3) below. For example, there are a method with the use of thesaurus and a method with the use of a statistical technique.

[Expression (2)]

$$SimS(c, j) = 1 - Distance(c, j) \quad (2)$$
or
$$SimS(c, j) = Similarity(c, j)$$

[Expression (3)]

$$Similarity(c, j) = \max_{e \in DTc}\{Similarity(e, j)\} \quad (3)$$

$$Distance(c, j) = \min_{e \in DTc}\{Distance(c, j)\}$$

(d) POS similarity degree SimP: A similarity degree SimP (c, j) between POS is calculated. An assembly of the POS is categorized into several groups according to knowledge of language. If a POS type of the word c is identical to a POS type of a word j, SimP(c, j)=1. If not, SimP(c, j)=0. As a matter of course, it is possible to calculate SimP(c, j) in an arbitrary method available to the public.

In addition, another arbitrary method available to the public may be employed for calculating SimM and SimS, in addition to the above-described methods. SimM, for example, is obtainable by a following expression (4). Here, MaxC(c, j) is a longest common string portion of character strings C and J. For example, MaxC(c, j) is abc, where c is xyabcef and j is efkeabcf. Alternatively, it is possible to calculate SimM and SimS with the use of a weighted edit distance between character strings in a following expression (5). Here, q denotes a weight of an inserted one character, r denotes a weight of a deleted one character, and P denotes a replacement weight of one character. Accordingly, P←q+r. As a referential document of the edit distance, there is known a document of V. I. Levenshtein, "One Method of Constructing Quasilinear Codes Providing Synchronization in the Presence of Errors", Problem of Information Transmission, Vol. 7, No. 3., p.p. 215-222, 1971.

[Expression (4)]

$$SimM(c, j) = \frac{2 \times MaxC(c, j)}{|c| + |j|} \quad (4)$$

[Expression (5)]

$$SimS(c, j) = \frac{Distance(c, j)}{|c| \times q + |j| \times r} \quad (5)$$

There are also alternative examples of calculating SimS as follows.

Akiko Aizawa and Kyo Kageura, "Calculating Associations between Technical Terms Based on Co-ocurrences in Keyword Lists of Academic Papers", IEICE, D-I, Vol. J83-D-I, No. 11, pp. 1154-1162, 2000.

Hinrich Schutze, "Ambiguity Resolution in Language Learning: Computational and Cognitive Models", CSLI Publications, Center for the Study of Language and Information, Stanford University, California, 1995.

Hideki Kozima and Teiji Furugori, "Semantic Similarity between Words", IEICE, AI92-100, pp. 81-88, 1993.

Hideki Kozima and Akira Ito, "A Context-sensitive Measurement of Semantic Word Distance", IEICE, Vol. 38, No. 3, pp. 482-489, 1997.

Next, a description is given of the association degree calculator 118 in detail. With respect to each word c in an example sentence CS where SimD(c, j)≠1, an association degree Ass between a word and a translation word thereof is calculated on an arbitrary word j in a translation sentence JS where SimD (w, j)≠1. For example, it can be calculated by many co-occurrence model, such as $\chi^2$, Dice Coefficient, mutual information content, T-score, and the like for the association degree Ass. As a matter of course, another arbitrary association degree available to the public may be employed.

According to an exemplary embodiment of the present invention, referring now to FIG. 9, parameters a, b, c, and d are defined when the association degree is calculated. It is possible to calculate the parameters a, b, c, and d between all the words and the translation words thereof, from the example sentence bilingual dictionary. Firstly, frequencies of appearance, freq (c) and freq (j) of the words included in all the example sentences and the translation words included in all the translation sentences are obtained. Subsequently, a co-occurrence frequency freq (c, j) between the word c in each example sentence and the translation word j in each translation sentence are obtained. Lastly, the parameters a, b, c, and d are obtained. Here, N represents the number of all the pairs of the example sentences and the translation sentences thereof in the corpus. d represents a value obtained by subtracting the parameters a, b, and c from N.

Next, with such obtained parameters, the association degree Ass(c, j) is obtained in a following expression (6).

[Expression (6)]

$$Ass(c, j) = Ass1(c, j) = \frac{a}{freq(c)} + \frac{a}{freq(j)} \quad (6)$$

In addition to the above-described methods of calculating the association degree, the association degree may be calculated by using the methods shown in FIG. 10. Sequentially from the top, there are shown $\chi^2$, Dice coefficient association degree, mutual information amount, T-score. Also, as a technical paper in relation to $\chi^2$ association degree and the association degree of mutual information amount, there is known a document of William A. Gale and Kenneth W. Church, "Identifying Word Correspondences in Parallel Texts", In Proceedings of DARPA Workshop on Speech and Natural Language, p.p. 152-157, 1991, Pacific Grove, Calif.

The similarity degree calculator 114 and the association degree calculator 118 produce and store a similarity degree/association degree list between the words in the example sentence and in the translation sentence, on the basis of such calculated similarity degree and association degree. The similarity degree/association degree list is preferably composed of an arrangement having a constant length. Here, the constant length is configured at 10. Taking a pair of an example sentence and a translation sentence thereof in FIG. 6A as an example, the example sentence in Chinese is divided into six words as shown in FIG. 11A, and the translation sentence in Japanese is divided into four words. As shown in FIG. 11B, sequentially from the top of the list, binary data of "0" or "1" is stored to show the similarity degree/association degree between the words in the example sentence and in the translation sentence. If "1" is stored in a word in the example sentence, there is a corresponding relation with a translation word. Without 1, there is no corresponding relation. FIG. 11C shows an alignment (corresponding relation) between a word in the example sentence and that in the translation sentence.

Figure 12:
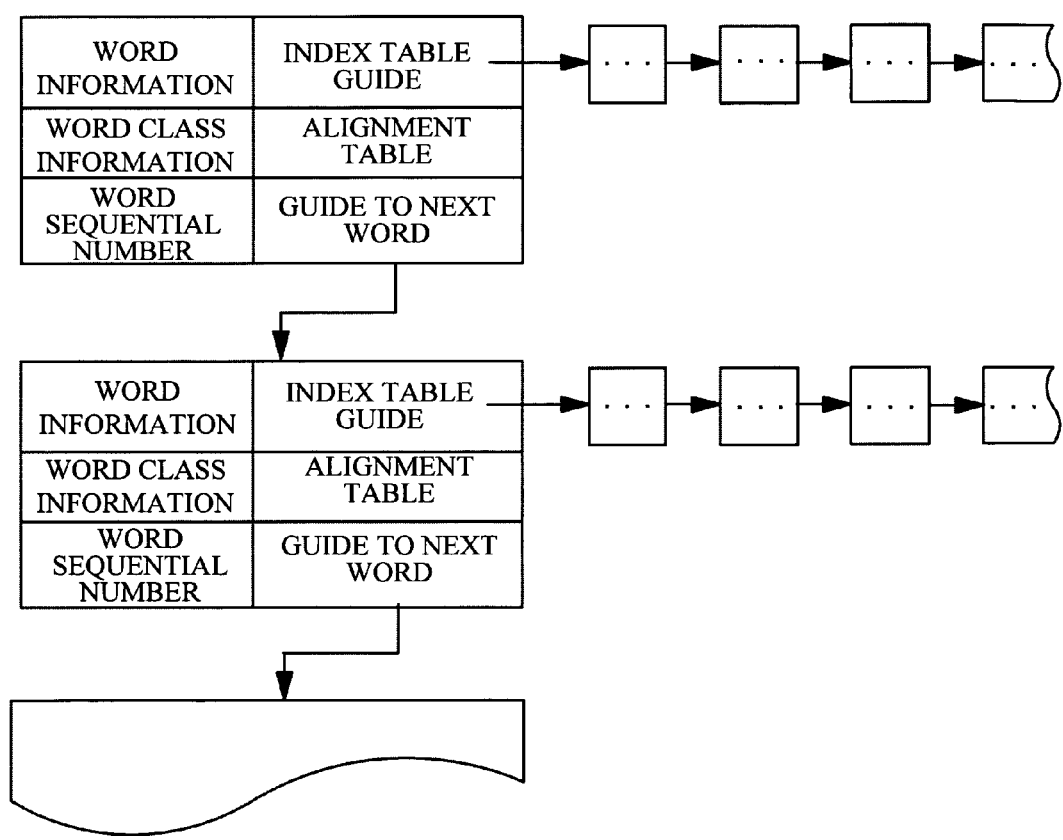
FIG. 12 is a view illustrating a data structure to store calculation results of the similarity degree and the association degree.

FIG. 12 is a data structure used to retain an alignment result and word information on the example sentence and that on the translation sentence. The data structure is composed of the word information, POS information, word sequential number, index table guide, alignment table, and next index table guide. The alignment table is extracted from the similarity degree/association degree list shown in FIG. 11A through FIG. 11C. The data structure is produced in the similarity degree calculator 114 and the association degree calculator 118, and is stored in a storage apparatus. FIG. 13 is an example of the produced data structure of the pair of example sentence and the translation sentence thereof, as shown in FIG. 6A.

Figure 14A:
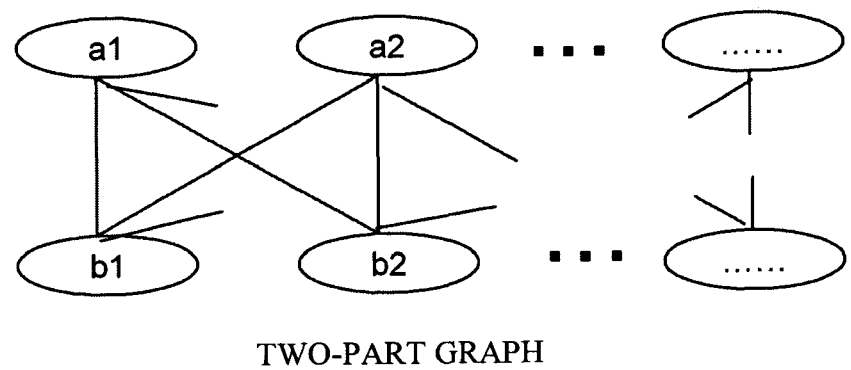
FIG. 14A and FIG. 14B illustrate an maximum weight matching of bipartite graph two-part graph matching.

A description is given of the bipartite graph-based alignment portion 120 in detail. On the basis of the similarity degree and the association degree calculated as described, referring now to FIG. 14A, it is possible to obtain a bipartite graph between the words in the example sentence and those in the translation sentence. In FIG. 14A, a1, a2, ... represent, for example, a word c of the example sentence in Chinese, and b1, b2, ... represent, for example, a word j of the translation sentence in Japanese. This corresponding relation is a result obtained from the alignment table, namely, the similarity degree/association degree list.

According to an exemplary embodiment of the present invention, the alignment is further optimized by a bipartite graph matching. Firstly, if the bipartite graph-based alignment portion 120 satisfies "e (a, b)<p", the corresponding relation is removed. e is a weight of a branch representing a corresponding relation between nodes in the bipartite graph. p is a nonnegative real number. This removes a corresponding word c and a translation word j.

After removal, a bipartite graph is produced with the use of remaining words of the example sentence and those in the translation sentence. CS is set to an assembly of translation words remaining in the example sentence, and JS is set to an assembly of words remaining in the translation sentence. As a method of making the graph, the bipartite graph is configured as G=(A, B,e(a, b)). Here, A and B represent assemblies of nodes in G, and e(a, b) represents a weight on a link between a node a of A and a node b of B. A=CS represents that each word in CS is corresponded to each node of A. B=JS represents that each translation word of JS is corresponded to each node of B.

e(a, b) is calculated with the use of a following expression (7). Assuming that a node a is corresponded to a word c and a node b is corresponded to a translation word j, $\alpha$, $\beta$, $\chi$, and $\delta$ are nonnegative real numbers, and SimD is a dictionary similarity degree.

[Expression (7)]

$$e(a, b) = \begin{cases} 1: & \text{if } SimD = 1 \\ \alpha * SimS(c, j) + \beta * SimM(c, j) + \\ \chi * SimP(c, j) + \delta * Ass(c, j): & \text{if } SimD = 0 \end{cases} \quad (7)$$

Figure 14B:
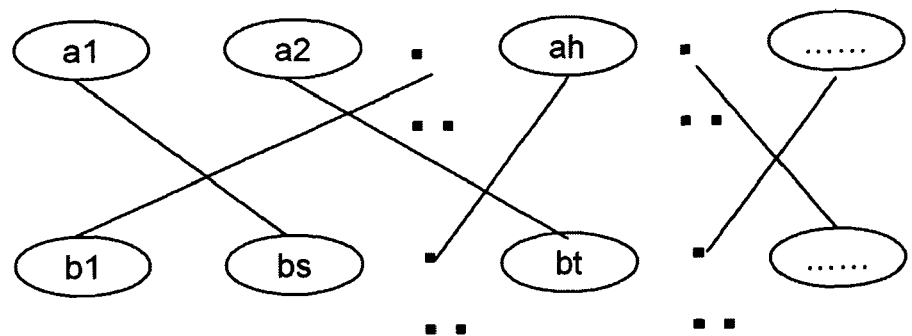

Next, a maximum and minimum weight matching of bipartite graph G=(A, B,e(a, b)). The maximum and minimum weight matching of bipartite graph G=(A, B,e(a, b)) is to select a branch of a bipartite graph G. As a selection method, the number of the branches selected from the branches connecting each node is equal to or smaller than 1, such selected number of the branches is the maximum, and a sum of weight of such selected branch is minimum. The word alignment {(c1, js), (c2, jt, ...)} is calculated with a calculated matching result M={(a1, b1), (a2, b2), ... }. Here, c1 corresponds to a1, c2 corresponds to a2, ..., and js corresponds to bs, jt corresponds to bt, . . . . FIG. 14B shows an optimized alignment on a one-on-one basis by means of the bipartite graph maximum and minimum weight matching. Here, the maximum and minimum weight matching is disclosed in, for example, Eugene L. Lawler, "Combinatorial Optimization: Networks and Matroids", Holt, Rinehart and Winston, New York, N.Y., 1976.

As stated heretofore, according to an exemplary embodiment of the present invention, the dictionary similarity degree, semantic similarity degree between words, shape similarity degree between words, POS similarity degree, and association degree of the words and translation words thereof are configured as weights on a link of the bipartite graph. The bipartite graph optimal matching enables a high recall rate and a word alignment with high accuracy. This makes it possible to build a word-aligned example sentence bilingual dictionary learning apparatus and a translation word extracting apparatus. Here, referring to FIG. 17, the above-described recall rate denotes a rate of the number of pairs of words that have been actually extracted with respect to the number of pairs of words that should be extracted from the example sentence and the translation sentence, and the precision denotes a rate of the number of pairs that are correct with respect to the number of pairs that have been actually extracted. In addition, by use of the bipartite graph optimal matching, it is possible to realize verification between an optimal word and a translation word thereof. Furthermore, with multiple similarity degrees, it is possible to improve the problem in alignment precision degradation and the problem in absence of registration, owing to the problem of word sense ambiguity.

Next, a second exemplary embodiment of the present invention is discussed. In the second exemplary embodiment, the operation of the bipartite graph-based alignment portion 120 is changed, and other configurations are same as those in the first exemplary embodiment.

Firstly, with respect to an example sentence and a translation sentence thereof that have been input, a word c in SimD (c, j)=1 is corresponded to a translation word j. That is to say, the alignment is fixed to remove from targets of the bipartite graph alignment processing.

If SimM(c, j) is greater than a threshold value $\theta$, the word c is corresponded (aligned) to the translation word j. Here, $\theta$ is a nonnegative real number.

If SimC(c, j) is greater than a threshold value $\epsilon$, the word c is corresponded (aligned) to the translation word j. Here, $\epsilon$ is a nonnegative real number.

The word c and the translation word j that have been corresponded in the afore-described three steps are removed from the pair of example sentence and the translation sentence thereof that have been input. If e(a, b)<$\rho$, the corresponding word c and the translation word j are removed. Here, $\rho$ is a nonnegative real number.

After the afore-described correspondences are removed, the bipartite graph is produced with the use of remaining words in the example sentence and those in the translation sentence. CS is set to an assembly of words remaining in the example sentence, and JS is set to an assembly of translation words remaining in the translation sentence. As a method of producing the graph, the bipartite graph is configured as G=(A, B, e (a, b)). Here, A and B represent assemblies of nodes, and e (a, b) represents a weight on a link between a node a of A and a node b of B. A=CS represents that each word c in CS is corresponded to the node a of A. B=JS represents that each translation word j is corresponded to the node b of B. e (a, b)=e (c, j)=$\alpha\times$Ass (c, j)+$\rho\times$SimP (c, j)+$\gamma\times$SimS(c, j)+$\delta\times$SimM (c, j), where $\alpha$, $\beta$, $\gamma$, and $\delta$ are nonnegative numbers.

Next, a maximum and minimum weight matching of the bipartite graph G=(A, B, e(a, b)). With the use of a matching result M={(a1, b1), (a2, b2), . . . }, a word alignment is calculated {(c1, js), (c2, jt)}. Here, c1 corresponds to a1, c2 corresponds to a2, . . . , and js corresponds to bs, jt corresponds to bt, . . . .

According to the second exemplary embodiment of the present invention, it is possible to speed up the word alignment processing by reducing the process of the bipartite graph-based alignment portion 120.

Figure 15:
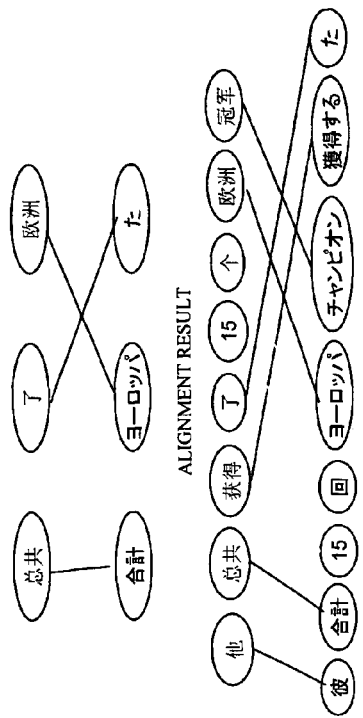
FIG. 15 is a table showing an example of word alignment of the example sentence and the translation sentence thereof that have been input according to a second exemplary embodiment of the present invention.

FIG. 15 is an example of the word alignment processing on a pair of example sentence and a translation sentence thereof that have been input, according to the second exemplary embodiment of the present invention. In SimD, the corresponding relation of the word represented by "1" denotes that the word is existent in the word bilingual dictionary, and an alignment is fixed. In FIG. 15, there are three "1", and these are removed.

SimS, SimM, and the association degree are calculated in the corresponding relation of the remaining words. In the second exemplary embodiment of the present invention, further removed are a corresponding relation of the word having the SimS threshold value E of greater than 0.999, a corresponding relation of the word having the SimM threshold value $\theta$ of greater than 0.999, and a corresponding relation of the word having the association degree of greater than 0.999. Consequently, the bipartite graph matching is performed on three words. Finally, it is shown that an alignment result that includes a bipartite graph matching between the word in the example sentence and that in the translation sentence.

FIG. 16 is a table showing experiment results of the word alignment in accordance with the second exemplary embodiment of the present invention. The example sentence bilingual dictionary includes 15,405 pairs of example sentences and translation sentences and the area thereof belongs to a sport journal article. A test assembly (Open test) includes 98 pairs of example sentences and translation sentences and the area thereof belongs to a sport journal article. As compared to a Baseline1 and Baseline2, 2BG employed in the second exemplary embodiment exhibits the improvement in the recall rate and accuracy. With respect to the association degree used in the second exemplary embodiment, Ass1 is employed for one of two 2BGs. $\chi^2$ is employed for the other.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A word alignment apparatus comprising:
   a word extracting portion that extracts each word from an example sentence and from a translation sentence thereof;
   an alignment calculator that calculates at least one of a similarity degree and an association degree between a word in a first language and that in a second language to perform an alignment between words respectively included in the example sentence in the first language and those included in the translation sentence thereof in the second language on the basis of a calculated value, wherein the alignment calculator calculates the similarity degree between the words with reference to a word bilingual dictionary and includes at least one of a shape similarity degree and a POS similarity degree; and an optimization portion that optimizes the alignment by performing a bipartite graph matching, wherein if a weight of a branch in the bipartite graph representing a correspondence relation between a word included in the first language as a first node in the bipartite graph, and a word included in the second language as a second node in the bipartite graph is smaller than a threshold value, the words are removed from the optimized alignment and a modified bipartite graph is produced with the remaining words that were not removed from the bipartite graph.

2. The word alignment apparatus according to claim 1, wherein the alignment calculator calculates an association degree between the words with reference to corpus statistic information.

3. The word alignment apparatus according to claim 2, wherein an association degree Ass(c, j) is calculated in an expression (A), where "c" denotes the word in the first language, "j" denotes the word in the second language, "a" denotes a co-occurrence frequency between a word "c" and a word "j", freq(c) denotes an occurrence frequency of the word "c", and freq(j) denotes the occurrence frequency of the word "j"

[Expression (A)]
$$Ass(c, j) = Ass1(c, j) = \frac{a}{freq(c)} + \frac{a}{freq(j)}.$$

4. The word alignment apparatus according to claim 1, wherein the optimization portion optimizes the alignment by performing a weighted two-part graph matching with a value of at least one of the similarity degree and the association degree that have been calculated by the alignment calculator.

5. The word alignment apparatus according to claim 4, wherein the optimization portion optimizes the alignment by performing a maximum and minimum weight matching on bipartite graph.

6. The word alignment apparatus according to claim 1, wherein if at least one of the similarity degree and the association degree between the words has a threshold value greater than a given threshold value, the optimization portion fixes the alignment between the words, and optimizes the alignment between remaining words.

7. The word alignment apparatus according to claim 1, wherein the word extracting portion performs a morphologic analysis on the example sentence and the translation sentence, and extracts the word from the example sentence and the translation sentence.

8. The word alignment apparatus according to claim 1, wherein the example sentence and the translation sentence are stored in an example sentence bilingual dictionary.

9. The word alignment apparatus according to claim 1, further comprising a storage portion that stores the alignment between the words that are optimized.

10. An example sentence bilingual dictionary comprising example sentences and translation sentences thereof that are aligned by a word alignment apparatus, the word alignment apparatus including:

a word extracting portion that extracts each word from an example sentence and from a translation sentence;

an alignment calculator that calculates at least one of a similarity degree and an association degree between a word in a first language and that in a second language to perform an alignment between words respectively included in the example sentence in the first language and those included in the translation sentence thereof in the second language on the basis of a calculated value, wherein the alignment calculator calculates the similarity degree between the words with reference to a word bilingual dictionary and the similarity degree includes at least one of a shape similarity degree and a POS similarity degree; and an optimization portion that optimizes the alignment by performing a bipartite graph matching, wherein if a weight of a branch in the bipartite graph representing a correspondence relation between a word included in the first language as a first node in the bipartite graph, and a word included in the second language as a second node in the bipartite graph is smaller than a threshold value, the words are removed from the optimized alignment and a modified bipartite graph is produced with the remaining words that were not removed from the bipartite graph.

11. A word alignment method executable in a computer readable medium comprising:

extracting each word from an example sentence and from a translation sentence thereof;

calculating at least one of a similarity degree and an association degree between a word in a first language and that in a second language to perform an alignment between words respectively included in the example sentence in the first language and those included in the translation sentence thereof in the second language on the basis of a calculated value, wherein the similarity degree between the words is calculated with reference to a word bilingual dictionary and includes at least one of a shape similarity degree and a POS similarity degree; and optimizing the alignment by performing a bipartite graph matching, wherein if a weight of a branch in the bipartite graph representing a correspondence relation between a word included in the first language as a first node in the bipartite graph, and a word included in the second language as a second node in the bipartite graph is smaller than a threshold value, the words are removed from the optimized alignment and a modified bipartite graph is produced with the remaining words that were not removed from the bipartite graph.

12. The word alignment method executable in a computer readable medium according to claim 11, wherein calculating calculates an association degree between the words with reference to corpus statistic information.

13. The word alignment method executable in a computer readable medium according to claim 12, wherein an association degree Ass(c, j) is calculated in an expression (A), where "c" denotes the word in the first language, "j" denotes the word in the second language, "a" denotes a co-occurrence frequency between a word "c" and a word "j", freq(c) denotes an occurrence frequency of the word "c", and freq(j) denotes the occurrence frequency of the word "j"

[Expression (A)]

$$Ass(c, j) = Ass1(c, j) = \frac{a}{freq(c)} + \frac{a}{freq(j)}.$$

14. The word alignment method executable in a computer readable medium according to claim 11, wherein optimizing optimizes the alignment by performing a weighted bipartite graph matching with a value of at least one of the similarity degree and the association degree that have been calculated.

15. The word alignment method executable in a computer readable medium according to claim 11, wherein optimizing optimizes the alignment by performing a maximum and minimum weight matching.

16. The word alignment method executable in a computer readable medium according to claim 11, wherein if at least one of the similarity degree and the association degree between the words has a threshold value greater than a given threshold value, optimizing fixes the alignment between the words, and optimizes the alignment between remaining words.

17. The word alignment method executable in a computer readable medium according to claim 11, wherein extracting extracts the example sentence and the translation sentence stored in an example sentence bilingual dictionary.

18. The word alignment method executable in a computer readable medium according to claim 11, wherein extracting performs a morphologic analysis on the example sentence and the translation sentence, and extracts the word from the example sentence and the translation sentence.

19. The word alignment method executable in a computer readable medium according to claim 11, further comprising storing the alignment between the words that are optimized.

20. A computer readable storage medium storing a program causing a computer to execute a process for word alignment, the process comprising:
   extracting each word from an example sentence and from a translation sentence thereof;
   calculating at least one of a similarity degree and an association degree between a word in a first language and that in a second language to perform an alignment between words respectively included in the example sentence in the first language and those included in the translation sentence thereof in the second language on the basis of a calculated value, wherein the similarity degree between the words is calculated with reference to a word bilingual dictionary and the similarity degree includes at least one of a shape similarity degree and a POS similarity degree; and
   optimizing the alignment by performing a two-part graph matching,
   wherein if a weight of a branch in the bipartite graph representing a correspondence relation between a word included in the first language as a first node in the bipartite graph, and a word included in the second language as a second node in the bipartite graph is smaller than a threshold value, the words are removed from the optimized alignment and a modified bipartite graph is produced with the remaining words that were not removed from the bipartite graph.

* * * * *